United States Patent
Fan

(10) Patent No.: US 8,240,685 B2
(45) Date of Patent: Aug. 14, 2012

(54) ROLLING DEVICE

(75) Inventor: Chen-Lu Fan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 312 days.

(21) Appl. No.: 12/642,074

(22) Filed: Dec. 18, 2009

(65) Prior Publication Data

US 2011/0061198 A1 Mar. 17, 2011

(30) Foreign Application Priority Data

Sep. 11, 2009 (CN) .......................... 2009 1 0306909

(51) Int. Cl.
  *B62B 1/00* (2006.01)
  *A47B 97/00* (2006.01)
(52) U.S. Cl. ................................ 280/79.11; 312/249.8
(58) Field of Classification Search .............. 280/79.11, 280/79.3; 16/32, 33, 99; 312/249.8–249.9, 312/249.11–249.13
See application file for complete search history.

(56) References Cited

U.S. PATENT DOCUMENTS

| | | | | |
|---|---|---|---|---|
| 1,145,096 A | * | 7/1915 | Thomes | 16/32 |
| 1,931,446 A | * | 10/1933 | Muller | 16/34 |
| 4,397,062 A | * | 8/1983 | Huang | 16/33 |
| 4,998,940 A | * | 3/1991 | Norman | 16/34 |
| 5,400,469 A | * | 3/1995 | Simonsen | 16/44 |
| 5,971,408 A | * | 10/1999 | Mandel et al. | 280/43.2 |
| 6,279,199 B1 | * | 8/2001 | Plate | 16/19 |
| 6,499,184 B2 | * | 12/2002 | Plate | 16/44 |
| 6,507,975 B2 | * | 1/2003 | Maupin et al. | 16/34 |
| 7,093,319 B2 | * | 8/2006 | Lemeur et al. | 16/44 |
| 2005/0236790 A1 | * | 10/2005 | Carter | 280/79.11 |

* cited by examiner

*Primary Examiner* — J. Allen Shriver, II
*Assistant Examiner* — James M Dolak
(74) *Attorney, Agent, or Firm* — Altis Law Group, Inc.

(57) ABSTRACT

A rolling device includes a frame, a rotatable member, a roller and an operating member. The frame is configured for being attached to a device enclosure. The rotatable member is secured to the frame and rotatable about a first axis relative to the frame. The roller is secured to the rotatable member and rotatable about a second axis parallel to the first axis. The operating member is secured to the rotatable member and rotatable about the second axis and capable of rotating the frame about the first axis.

13 Claims, 6 Drawing Sheets

US 8,240,685 B2

ROLLING DEVICE

BACKGROUND

1. Technical Field

The present disclosure relates to rolling device for conveniently moving a device.

2. Description of Related Art

A plurality of posts is located at a bottom surface of a server to support it on ground. In movement, two or more persons are usually required to lift up the server and then move it to a predetermined location, which is very inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
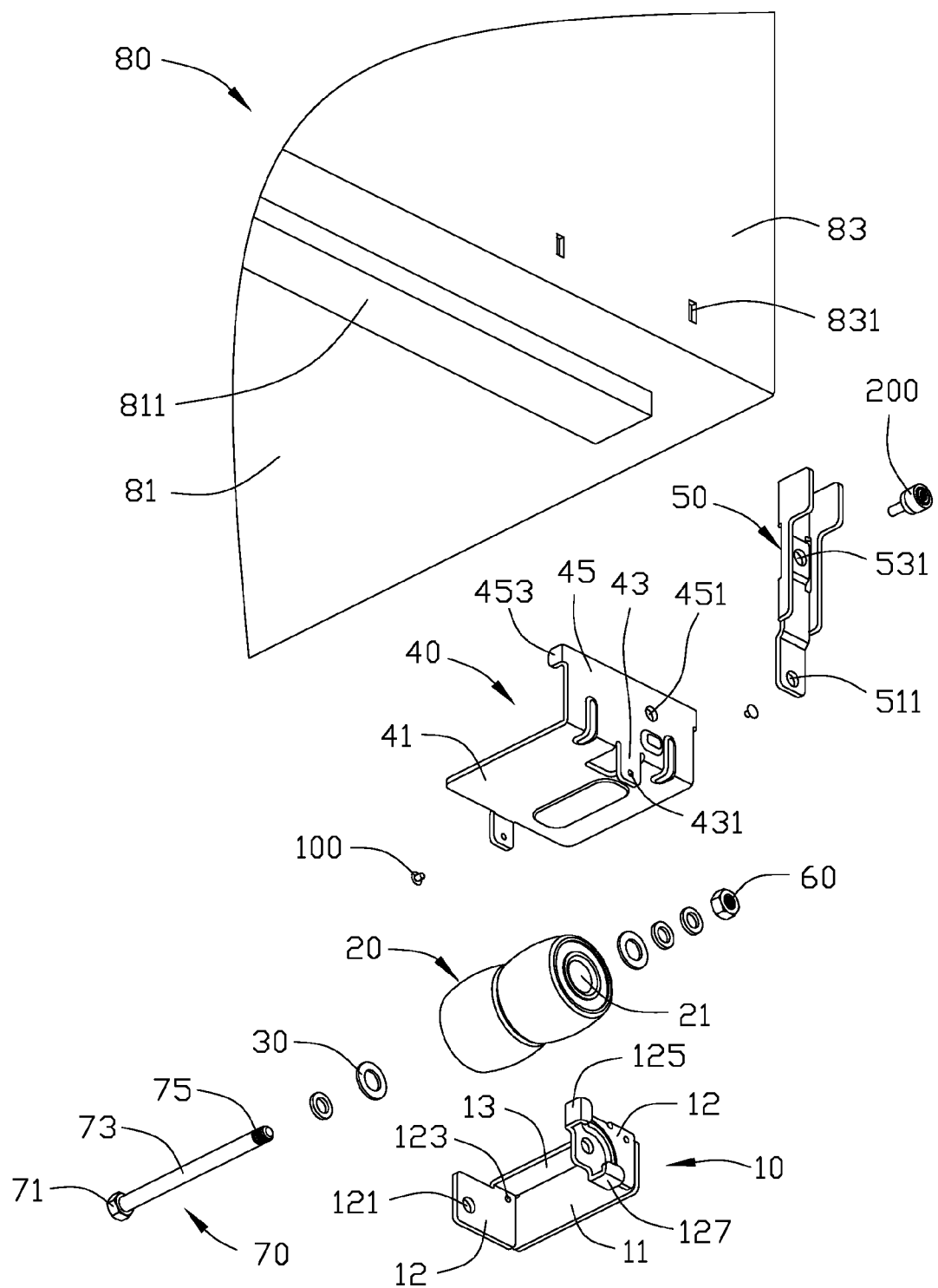
FIG. 1 is an exploded, isometric, cutaway view of a rolling device and an enclosure in accordance with an embodiment.

Referring to FIG. 1, a rolling device in accordance with an embodiment includes a frame 40 configured to be attached to an enclosure 80, a rotatable member 10, a roller 20, and an operating member 50.

The enclosure 80 includes a bottom panel 81 and two parallel side panels 83 (only one shown in FIG. 1). Two supporting portions 811 (only one shown in FIG. 1) are attached to a bottom surface of the bottom panel 81. Each side panel 83 is perpendicular to the bottom panel 81 and defines two securing slots 831 in opposite ends adjacent the bottom panel 81.

The frame 40 includes a base sheet 41 and a side sheet 45 perpendicular to the base sheet 41. Two parallel pieces 43 are located on the base sheet 41, and each piece 43 defines a pivot hole 431. The side sheet 45 defines a mounting hole 451. Two securing tabs 453 are located on the side sheet 45 and configured to engage in the securing slots 831 of the side panel 83.

The rotatable member 10 is configured to be secured to the frame 40 and includes a base wall 11, two sidewalls 12, and a connecting wall 13. The sidewalls 12 and the connecting wall 13 are substantially perpendicular to the base bard 11. Each sidewall 12 defines a mounting hole 123, adjacent the base wall 11 and the connecting wall 13, and a fixing hole 121, away from the base wall 11 and the connecting wall 13. A first block tab 125 and a second block tab 127 are located on adjacent edges of one sidewall 12.

The roller defines a roller hole 21 configured to receive a shaft member 70. The shaft member 70 is configured to be rotatably received in the fixing holes 121 of the rotatable member 10, and includes a head portion 71, a shaft portion 73 and a threaded portion 75. The shaft portion 73 is connected between the head portion 71 and the threaded portion 75. The threaded portion 75 is configured to engage with a nut 60.

The operating member 50 defines a through hole 511 and a retaining hole 531. The through hole 531 is configured to receive the threaded portion 75 of the shaft member 70. The retaining hole 531 corresponds to the mounting hole 451 of the frame 40.

Figure 2:
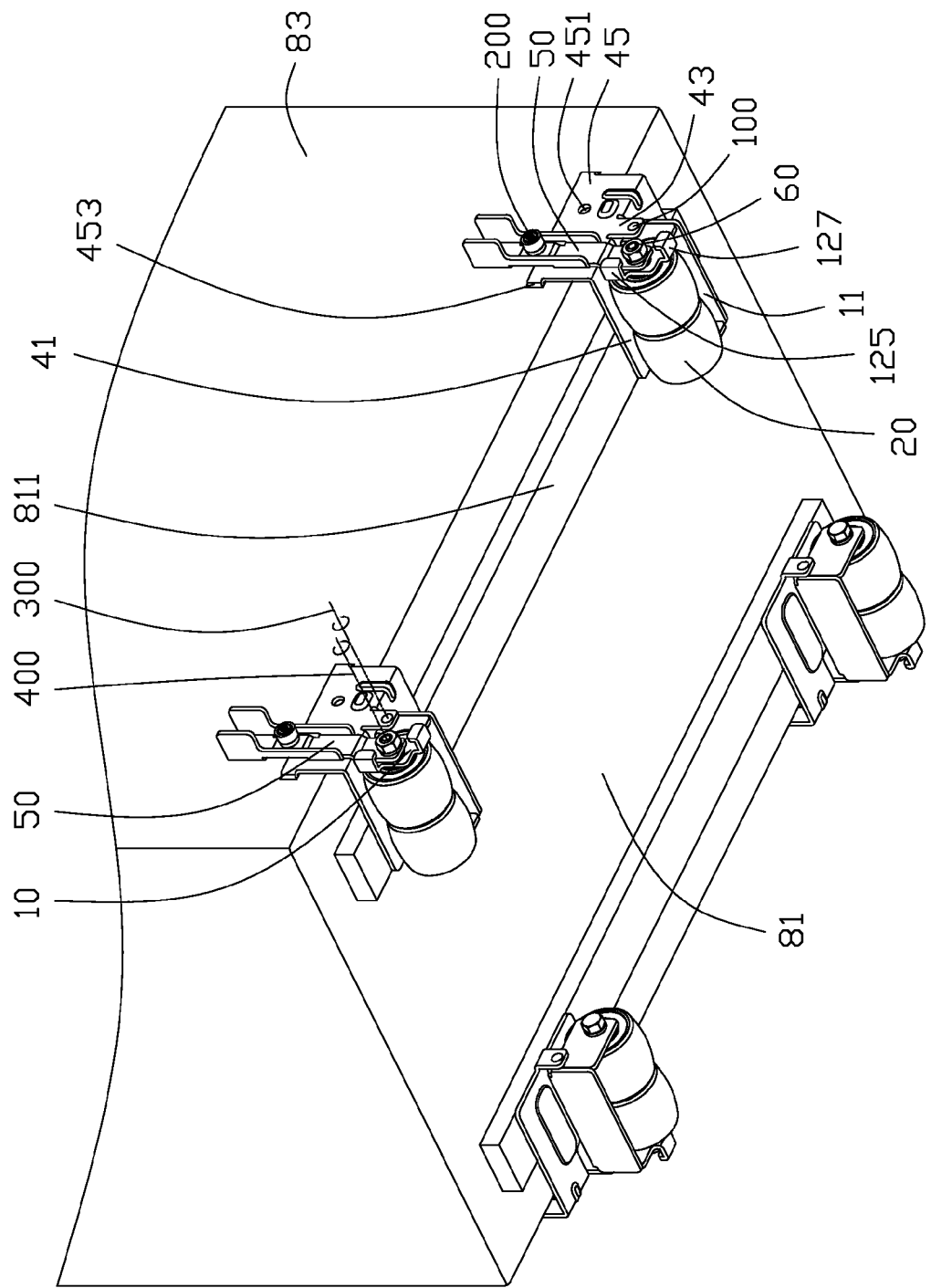
FIG. 2 is an assembled view of four rolling devices and the enclosure of FIG. 1.

Referring to FIGS. 1-2, in assembling the rolling devices to the enclosure 80, the roller 20 is positioned between the sidewalls 12 of the rotatable member 10, and the roller hole 21 is aligned with the fixing holes 121 of the sidewalls 12. The shaft member 70 is inserted into the fixing holes 121 and the roller hole 21, and the threaded portion 75 is exposed out of one of the one sidewall 12 correspondingly. The operating member 50 is located on one sidewall 12, and the threaded portion 75 is inserted in the through hole 511. The nut member 60 is fixed on the threaded portion 75, so that the roller 20 and the operating member 50 are secured to the rotatable member 10. The roller 20 and the operating member 50 are rotatable about the shaft member 70, or a second axis 400. The rotatable member 40 is positioned between the pieces 43 of the frame 40, and the mounting holes 123 are aligned with the pivot holes 431. Two fixing members 100 are fixed in the mounting holes 123 and the pivot holes 431, so that the frame 40 is secured to the enclosure 80 and rotatable about the fixing members 100, or a first axis 300 relative to the enclosure 80.

In one embodiment, a plurality of washers 30 is respectively secured between the head portion 71 and the corresponding one sidewall 12, the sidewalls 12 and the roller 20, the corresponding one sidewall 12 and the operating member 50, and the operating member 50 and the nut member 60.

Four connecting devices can be attached to the enclosure 80. In assembling each connecting device to the enclosure 80, the frame 40 is positioned under the bottom panel 81 and abuts the supporting portion 811. The securing tabs 453 are engaged in the corresponding securing slots 831 of the side panel 83. Therefore, each of the connecting devices is secured to the enclosure 80.

Figure 3:
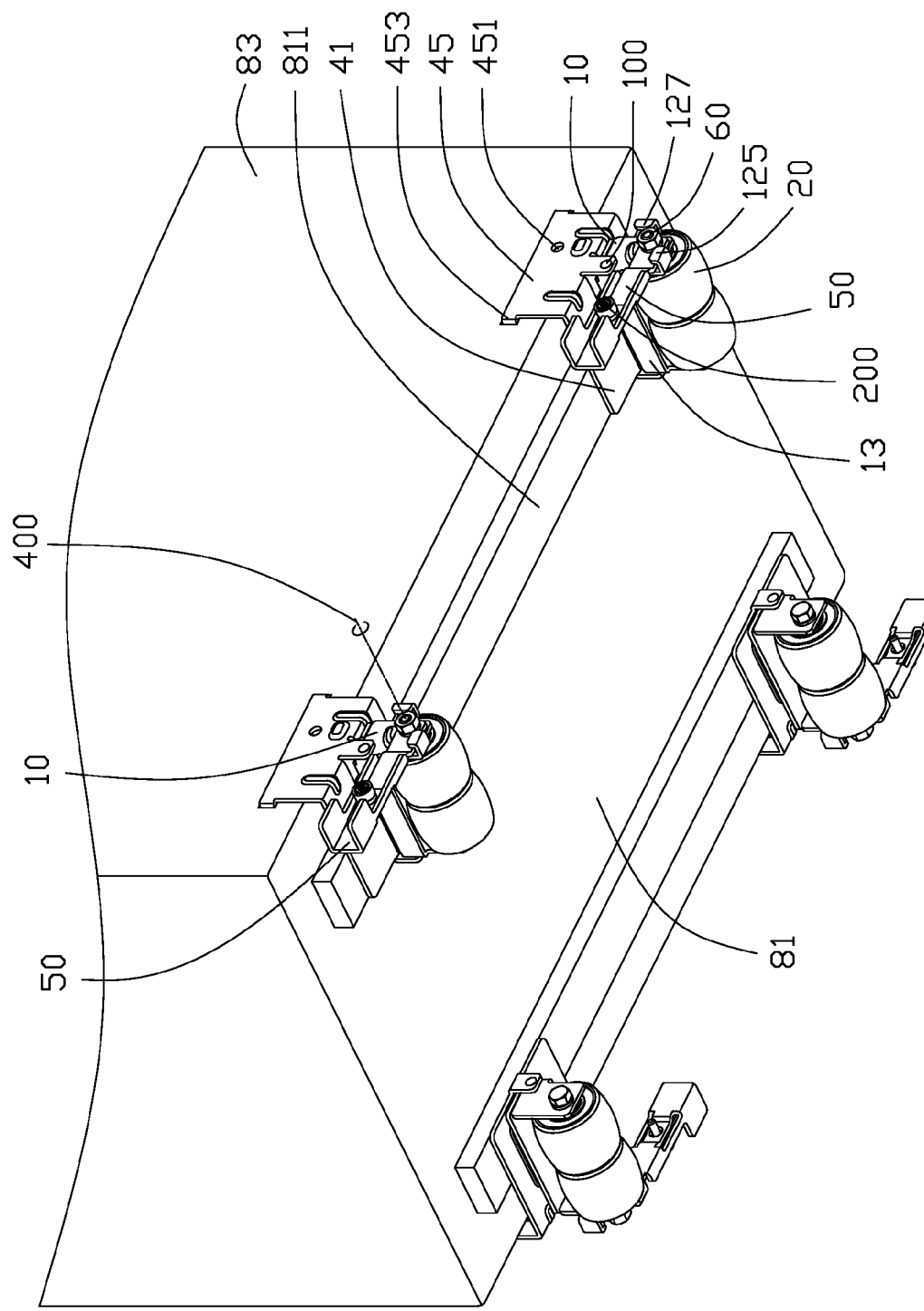
FIG. 3 is similar to FIG. 2, but showing the rolling devices and the operating members in a different position.
Figure 4:
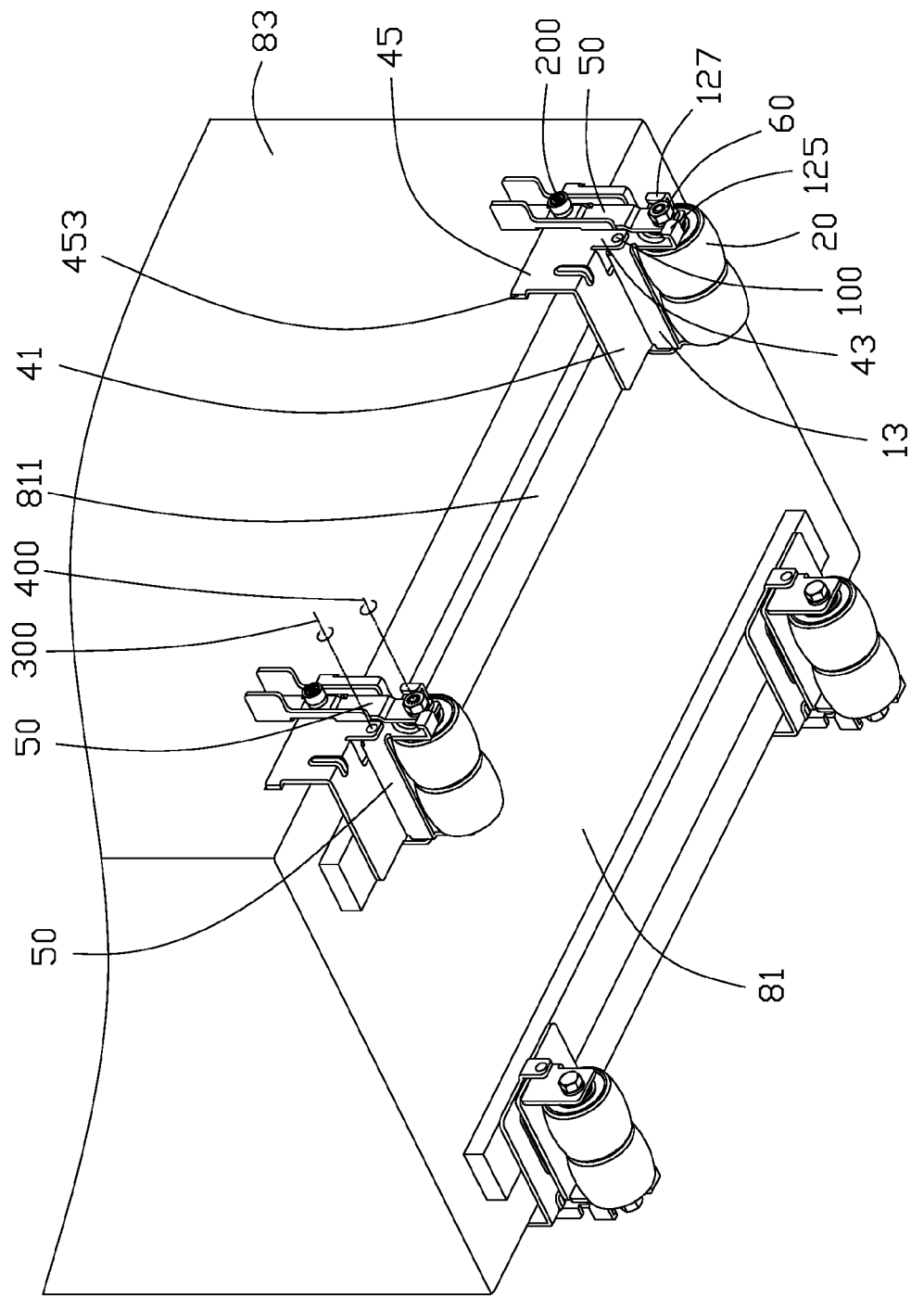
FIG. 4 is similar to FIG. 3, but showing the operating members in a different position.
Figure 5:
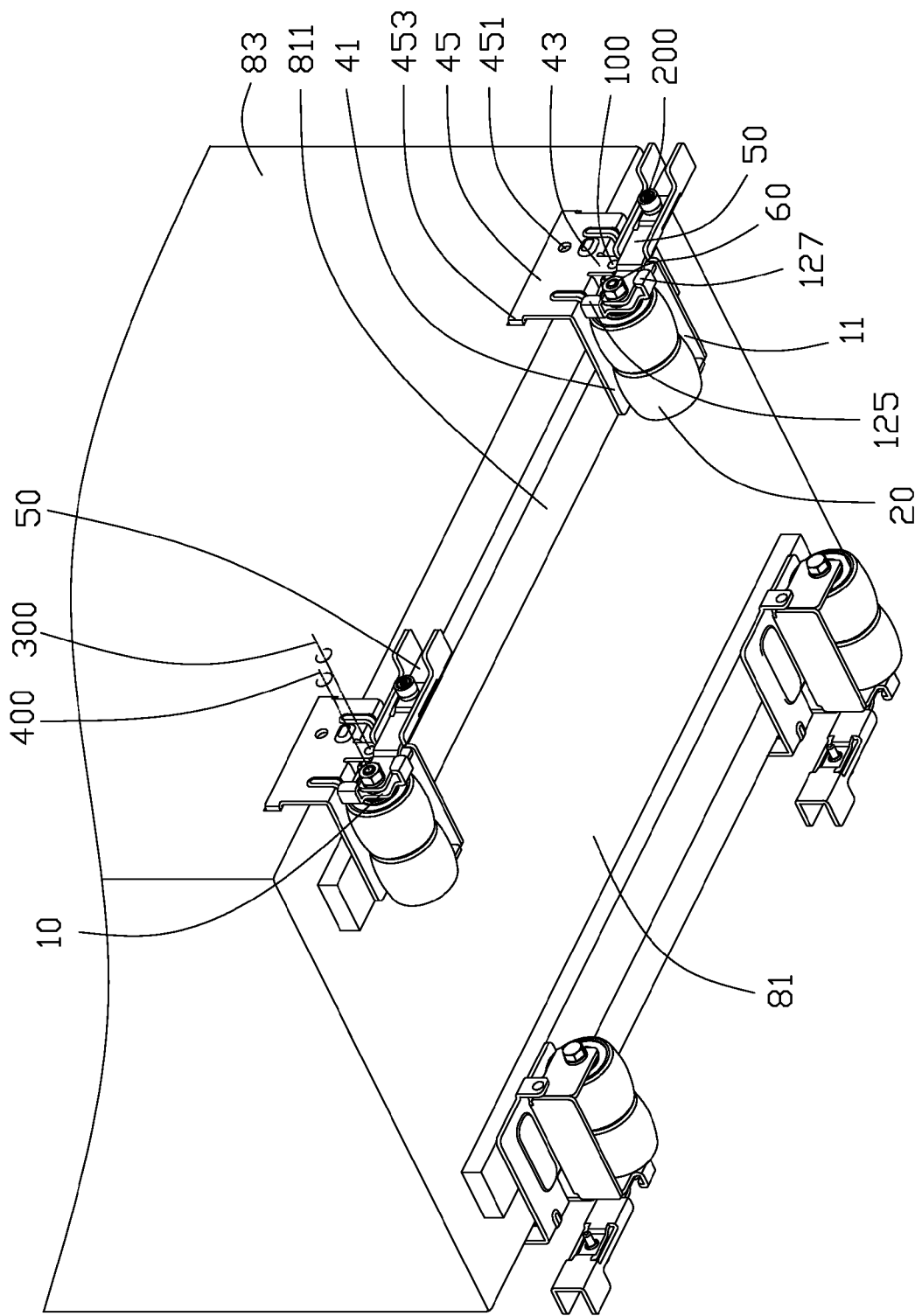
FIG. 5 is similar to FIG. 2, but showing the operating members in a different position.

Referring also to FIGS. 2 and 5, each rotatable member 10 is in a first position. The connecting wall 12 is positioned parallel to and abuts the base sheet 41 of the frame 40. The base wall 11 and the sidewalls 12 are positioned perpendicular to the base sheet 41. A first distance is defined between each shaft member 70 and the base sheet 41. Referring also to FIGS. 3-4, each rotatable member 10 is in a second position. The connecting wall 12 and the sidewalls 12 are positioned perpendicular to the base sheet 41 of the frame 40. The base wall 11 is positioned parallel to and abuts the base sheet 41. A second distance is defined between each shaft member 70 and the base sheet 41, and longer than the first distance.

Referring also to FIGS. 2-3, each rotatable member 10 is positioned in the first position. In order to rotate each rotatable member 10 from the first position to the second position, the operating member 50 is rotated about the second axis 400 along an arrow direction shown in FIG. 2 and pushes against the first block tab 125 of the rotatable member 10, so as to rotate the rotatable member 10 about the first axis 300 along an arrow direction shown in FIG. 2. The rotatable member 10 can be thus rotated from the first position to the second position. Referring to FIG. 3, after the rotatable member 10 is positioned in the second position, the operating member 50 is rotated about the second axis 400 along an arrow direction shown in FIG. 3. When the retaining hole 531 of the operating member 50 is aligned with the mounting hole 451 of the frame 45 (shown in FIG. 4), a locking member 200 is fixed in the retaining hole 531 and the mounting hole 451 to secure the operating member 50 to the frame 40.

Figure 6:
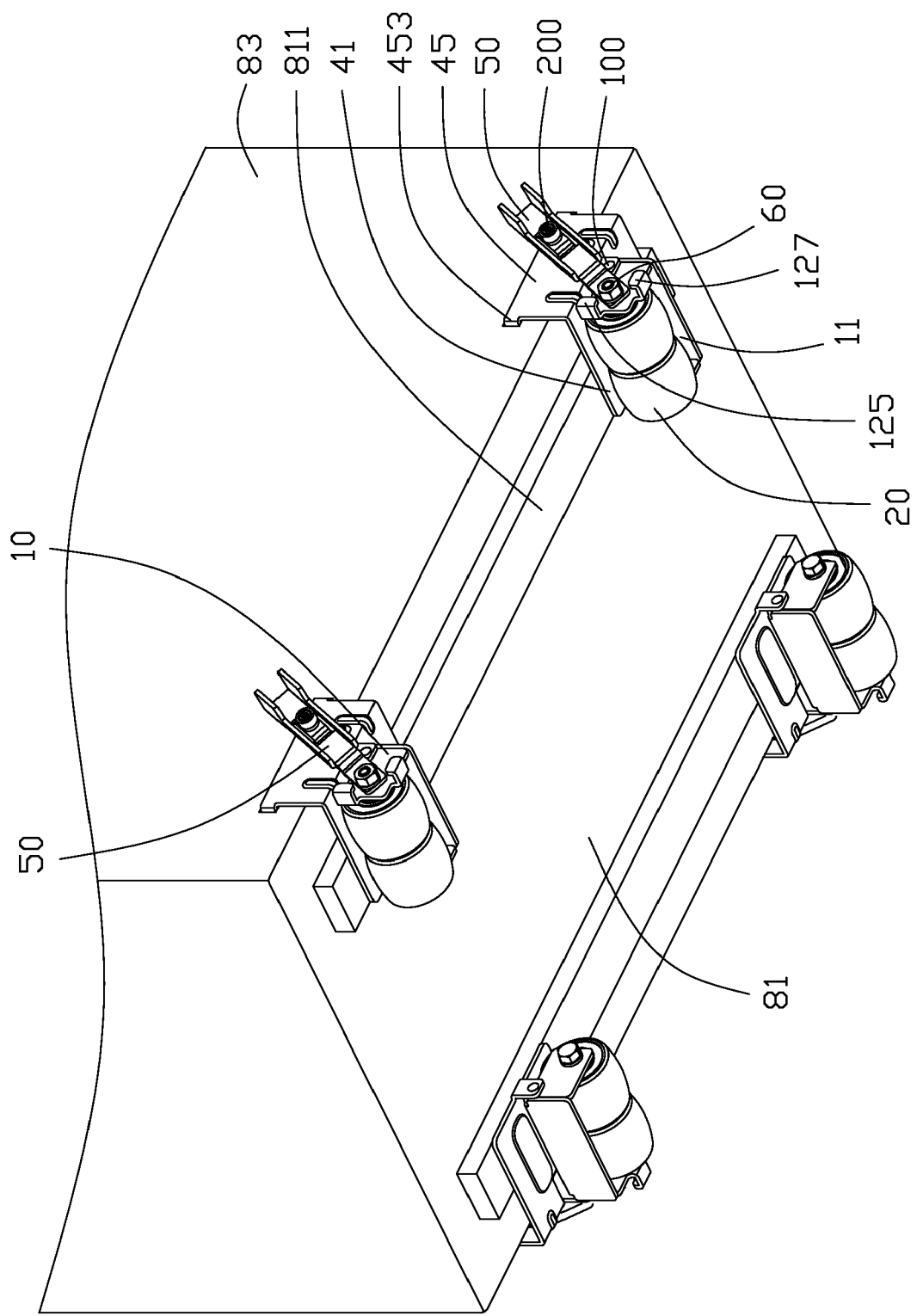
FIG. 6 is similar to FIG. 5, but showing the operating members in a different position.

Referring also to FIGS. 4-5, in order to rotate each rotatable member 10 from the second position to the first position, the locking member 200 is removed from the mounting hole 451 of the frame 40. The operating member 50 can be rotated about the second axis 400 along an arrow direction shown in FIG. 4, push against the second block tab 127 of the rotatable member 10, and rotate the rotatable member 10 about the first axis 300 along an arrow direction shown in FIG. 4. The rotatable member 10 can be thus rotated from the second position to the first position. Referring to FIG. 5, after the rotatable member 10 is positioned in the first position, the operating member 50 is rotated about the second axis 400 along an arrow direction G shown in FIG. 5. Referring also to FIG. 6, when the retaining hole 531 of the operating member 40 is aligned with the mounting hole 451 of the frame 45, the locking member 200 is fixed in the retaining hole 531 and the mounting hole 451 again to secure the operating member 50 to the frame 40.

After the enclosure 80 is moved to a predetermined position, the securing tabs 453 are removed from the corresponding securing slots 831 of the side panel 83. Therefore, each connecting devices can be removed from the enclosure 80.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A rolling device comprising:
   a frame configured for being attached to a device enclosure; and
   a rotatable member secured to the frame and rotatable about a first axis relative to the frame;
   a shaft member parallel to the first axis;
   a roller secured to the rotatable member by the shaft member, and the roller being rotatable about the shaft member; and
   an operating member secured to the rotatable member by the shaft member and rotatable about the shaft member, when the operating member is
   rotated about the shaft member, the operating member rotates the rotatable member about the first axis.

2. The rolling device of claim 1, wherein the frame comprises a base sheet; the rotatable member is secured to the base sheet and comprises a base wall and a connecting wall perpendicular to the base wall.

3. The rolling device of claim 2, wherein the rotatable member is rotatable between a first position, where the connecting wall is parallel to and abuts the base sheet of the frame, and a second position, where the base wall is parallel to and abuts the base sheet.

4. The rolling device of claim 3, wherein a distance between the second axis and the base sheet of the frame when the rotatable member is in the first position is shorter than when the rotatable member is in the second position.

5. The rolling device of claim 2, wherein the rotatable member further comprises two parallel sidewalls perpendicular to the base wall and the connecting wall; a block tab is located on one of the sidewalls; and the blocking tab is capable of being pushed by the operating member to rotate the rotatable member.

6. The rolling device of claim 5, wherein each sidewall of the rotatable member defines a fixing hole; the roller defines a roller hole; a shaft member is secured in the fixing holes and the roller hole so as to secure the roller to the rotatable member between the sidewalls; and the roller is rotatable on the shaft member.

7. The rolling device of claim 5, wherein two parallel pieces are located on the base sheet of the frame; each piece defines a pivot hole; each sidewall of the rotatable member defines a mounting hole; fixing members are engaged in the mounting holes and the pivot holes to secure the rotatable member to the frame between the pieces.

8. The rolling device of claim 2, wherein the frame further comprises a side sheet perpendicular to the base sheet; and two securing tabs are located on the side sheet.

9. A rolling device comprising:
   a frame configured for being attached to a device enclosure and comprising a base sheet; and
   a rotatable member rotatably secured to the base sheet of the frame, the rotatable member comprising a base wall and a connecting wall perpendicular to the base wall;
   a roller rotatably secured to the rotatable member; and
   an operating member rotatably secured to the rotatable member;
   wherein the rotatable member is rotatable between a first position, where the connecting wall is parallel to and abuts the base sheet of the frame, and a second position, where the base wall is parallel to and abuts the base sheet; the rotatable member further comprises two parallel sidewalls that are perpendicular to the base wall and the connecting wall; and a block tab is located on one of the sidewalls, and the block tab is capable of being pushed by the operating member to rotate the rotatable member.

10. The rolling device of claim 9, wherein the rotatable member is rotatable about a first axis; the roller is rotatable about a second axis; a distance between the second axis and the base sheet of the frame when the rotatable member is in the first position is shorter than when the rotatable member is in the second position.

11. The rolling device of claim 9, wherein each sidewall of the rotatable member defines a fixing hole; the roller defines a roller hole; a shaft member is secured in the fixing holes and the roller hole so as to secure the roller to the rotatable member between the sidewalls; the roller is rotatable on the shaft member.

12. The rolling device of claim 9, wherein two parallel pieces are located on the base sheet of the frame; each piece defines a pivot hole; each sidewall of the rotatable member defines a mounting hole; fixing members are engaged in the mounting holes and the pivot holes to secure the rotatable member to the frame between the pieces.

13. The rolling device of claim 9, wherein the frame further comprises a side sheet perpendicular to the base sheet; two securing tabs are located on the side sheet.

* * * * *